United States Patent
Liu et al.

(10) Patent No.: US 12,232,121 B2
(45) Date of Patent: Feb. 18, 2025

(54) SYSTEMS AND METHODS FOR TRANSMITTING SIGNALS

(71) Applicant: ZTE CORPORATION, Guangdong (CN)

(72) Inventors: Xing Liu, Shenzhen (CN); Peng Hao, Shenzhen (CN); Wei Gou, Shenzhen (CN); Xianghui Han, Shenzhen (CN); Jing Shi, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 389 days.

(21) Appl. No.: 17/705,018

(22) Filed: Mar. 25, 2022

(65) Prior Publication Data
US 2022/0217750 A1    Jul. 7, 2022

Related U.S. Application Data

(63) Continuation of application No. PCT/CN2019/109010, filed on Sep. 29, 2019.

(51) Int. Cl.
*H04W 72/21*    (2023.01)
*H04W 72/566*   (2023.01)

(52) U.S. Cl.
CPC ......... *H04W 72/21* (2023.01); *H04W 72/569* (2023.01)

(58) Field of Classification Search
CPC ...... H04W 72/21; H04W 72/569; H04L 5/003
See application file for complete search history.

(56) References Cited

U.S. PATENT DOCUMENTS

| | | | |
|---|---|---|---|
| 2017/0064638 A1* | 3/2017 | Li | H04W 52/10 |
| 2018/0279327 A1 | 9/2018 | Ying et al. | |
| 2019/0053097 A1 | 2/2019 | Rico Alvarino et al. | |
| 2019/0223205 A1 | 7/2019 | Papasakellariou | |
| 2019/0230683 A1 | 7/2019 | Akkarakaran et al. | |
| 2020/0059871 A1* | 2/2020 | Ryu | H04W 52/245 |

FOREIGN PATENT DOCUMENTS

| | | |
|---|---|---|
| CN | 107926037 A | 4/2018 |
| CN | 108702265 A | 10/2018 |
| CN | 108702778 A | 10/2018 |
| CN | 109076527 A | 12/2018 |
| CN | 109923824 A | 6/2019 |

(Continued)

OTHER PUBLICATIONS

International Search Report and Written Opinion for PCT Appl. No. PCT/CN2019/109010 mailed Jun. 29, 2020 (8 pages).

(Continued)

*Primary Examiner* — Jamal Javaid
*Assistant Examiner* — Ryan C Kavleski
(74) *Attorney, Agent, or Firm* — Foley & Lardner LLP

(57) ABSTRACT

Systems and methods for wireless communications are disclosed herein. In one embodiment, a wireless communication device determines that transmission of uplink control information (UCI) on at least a portion of a first uplink resource is canceled. In response to determining that the transmission of the UCI on the first resource is canceled, the wireless communication device determines a second uplink resource for transmitting the UCI. The wireless communication device transmits the UCI on the second uplink resource.

12 Claims, 8 Drawing Sheets

(56) References Cited

FOREIGN PATENT DOCUMENTS

| EP | 2 184 863 | A1 | | 5/2010 | |
|----|-----------|----|----|--------|----|
| WO | WO-2018/143738 | A1 | | 8/2018 | |
| WO | WO-2019/069465 | A1 | | 4/2019 | |
| WO | WO-2019/140665 | A1 | | 7/2019 | |
| WO | WO-2020092985 | A1 | * | 5/2020 | .......... H04W 52/146 |
| WO | WO-2020247523 | A1 | * | 12/2020 | .......... H04W 52/146 |

OTHER PUBLICATIONS

Wilus Inc.: "On UL cancellation scheme for NR URLLC" 3GPP TSG RAN WGI #97 R1-1907387 May 4, 2019(May 4, 2019) (5 Pages), Reno, USA.

3rd Generation Partnership Project, "Technical Specification Group Radio Access Network; Study on physical layer enhancements for NR ultra-reliable and low latency case (URLLC) (Release 16)", 3GPP TR 38.824 V16.0.0, Mar. 2019, Valbonne, France (78 pages).

MCC Support, "Final Report of 3GPP TSG RAN WG1 #98 v2.0.0 (Prague, Czech Rep, Aug. 26-30, 2019)", 3GPP TSG RAN WG1 Meeting #98bis, R1-1911429, Oct. 18, 2019, Chongqing, China (181 pages).

Vivo, "Summary#2 of UL inter UE Tx prioritization/multiplexing", 3GPP TSG RAN WG1 #98, R1-1909774, Aug. 30, 2019, Prague, CZ (40 pages).

First Office Action for TW App. No. 109129956 dated Nov. 13, 2023 (with English machine translation, 24 pages).

Ericsson, "Inter-UE Prioritization and Multiplexing of UL Transmissions," 3GPP TSG RAN WG1 Meeting #98; R1-1908125; Prague, Czech Republic; Aug. 26-30, 2019 (8 pages).

First Office Action and Search Report for CN App. No. 201980102623.0 dated May 23, 2024 (with English translation, 15 pages).

Extended European Search Report on EP Application No. 19946398.5 dated Sep. 15, 2022 (13 pages).

Vivo: "Summary#2 of UL inter UE Tx prioritization/multiplexing," 3GPP TSG RAN WG1 Meeting #97; May 13-17, 2019; R1-1907819; Reno, USA (35 pages).

Vivo: "UL inter-UE Tx prioritization for URLLC," 3GPP TSG RAN WG1 #97; May 13-17, 2019; R1-1906150; Reno, USA (13 pages).

Extended European Search Report on EP 23174892.2 dated Jul. 10, 2023 (14 pages).

Guangdong Oppo Mobile Telecom, "Uplink power control mechanism for NR," 3GPP TSG RAN WG1 Meeting NR#3; R1-1715675; Sep. 18-21, 2017; Nagoya, Japan (3 pages).

Huawei, et al., "UL inter-UE transmission prioritization and multiplexing," 3GPP TSG RAN WG1 Meeting #98, R1-1908055, Aug. 26-30, 2019, Prague, CZ (13 pages).

* cited by examiner

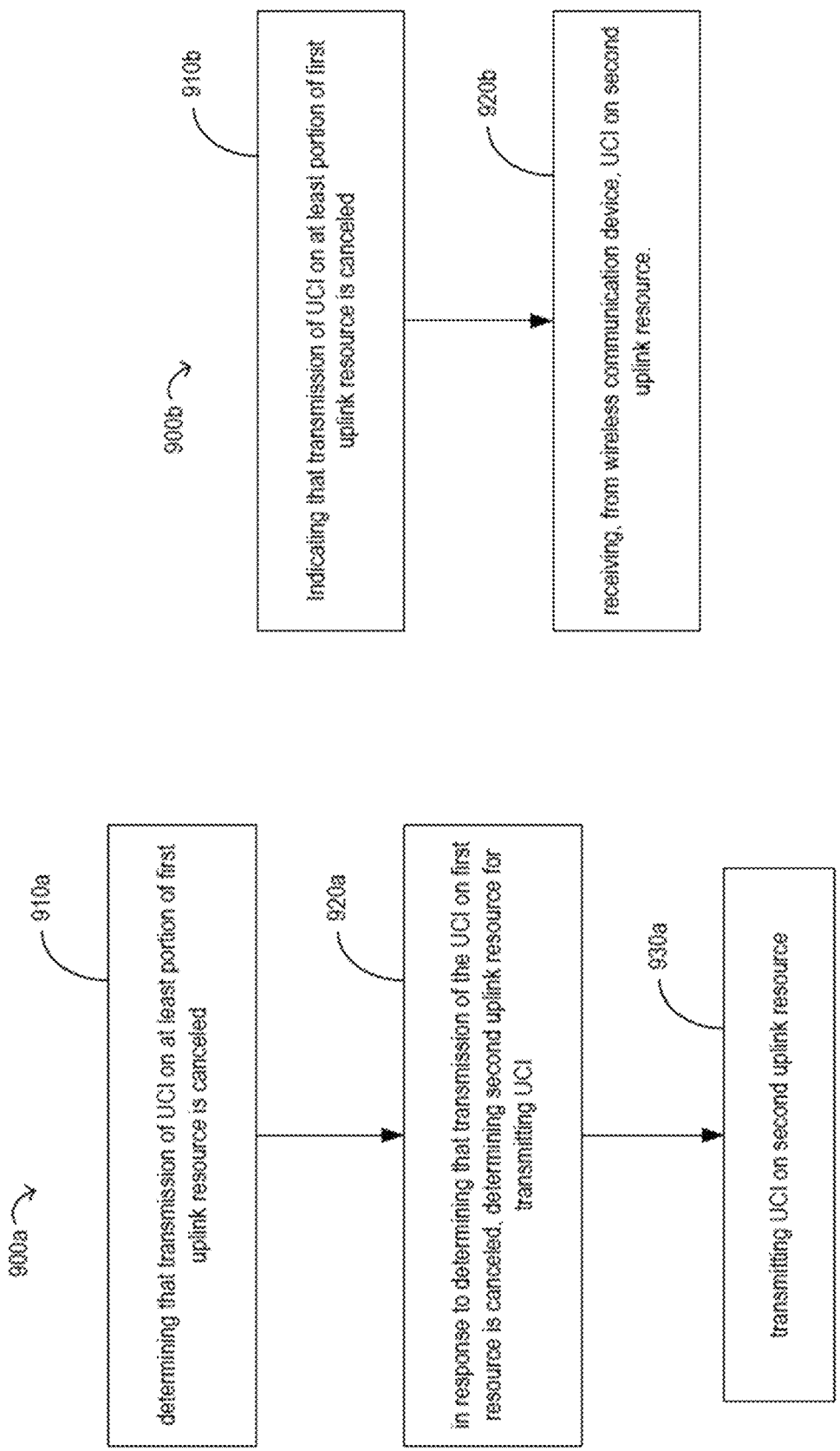

SYSTEMS AND METHODS FOR TRANSMITTING SIGNALS

CROSS-REFERENCE TO RELATED APPLICATIONS

This application claims the benefit of priority under 35 U.S.C. § 120 as a continuation of PCT Patent Application No. PCT/CN2019/109010, filed on Sep. 29, 2019, the disclosure of which is incorporated herein by reference in its entirety

TECHNICAL FIELD

The present disclosure relates to the field of telecommunications, and in particular, to uplink transmission of control information by a wireless communication device.

BACKGROUND

Demands for the 4th Generation Mobile Communication Technology (4G), Long-Term Evolution (LTE), Advanced LTE (LTE-Advanced or LTE-A), and the 5th Generation Mobile Communication Technology (5G) are increasing at a rapid pace. Developments are taking place to provide enhanced mobile broadband, ultra-high reliability, ultra-low-latency transmission, and massive connectivity in 4G and 5G systems.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

In some embodiments, a wireless communication device determines that transmission of uplink control information (UCI) on at least a portion of a first uplink resource is canceled. In response to determining that the transmission of the UCI on the first resource is canceled, the wireless communication device determines a second uplink resource for transmitting the UCI. The wireless communication device transmits the UCI on the second uplink resource.

In some embodiments, a base station indicates to a wireless communication device that transmission of UCI on at least a portion of a first uplink resource is canceled. The base station receives from the wireless communication device the UCI on the second uplink resource.

The above and other aspects and their implementations are described in greater detail in the drawings, the descriptions, and the claims.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

FIGS. 9A and 9B are flowchart diagrams illustrating methods for restoring UCI transmission, in accordance with some embodiments of the present disclosure;

DETAILED DESCRIPTION OF EXAMPLE EMBODIMENTS

Figure 1:
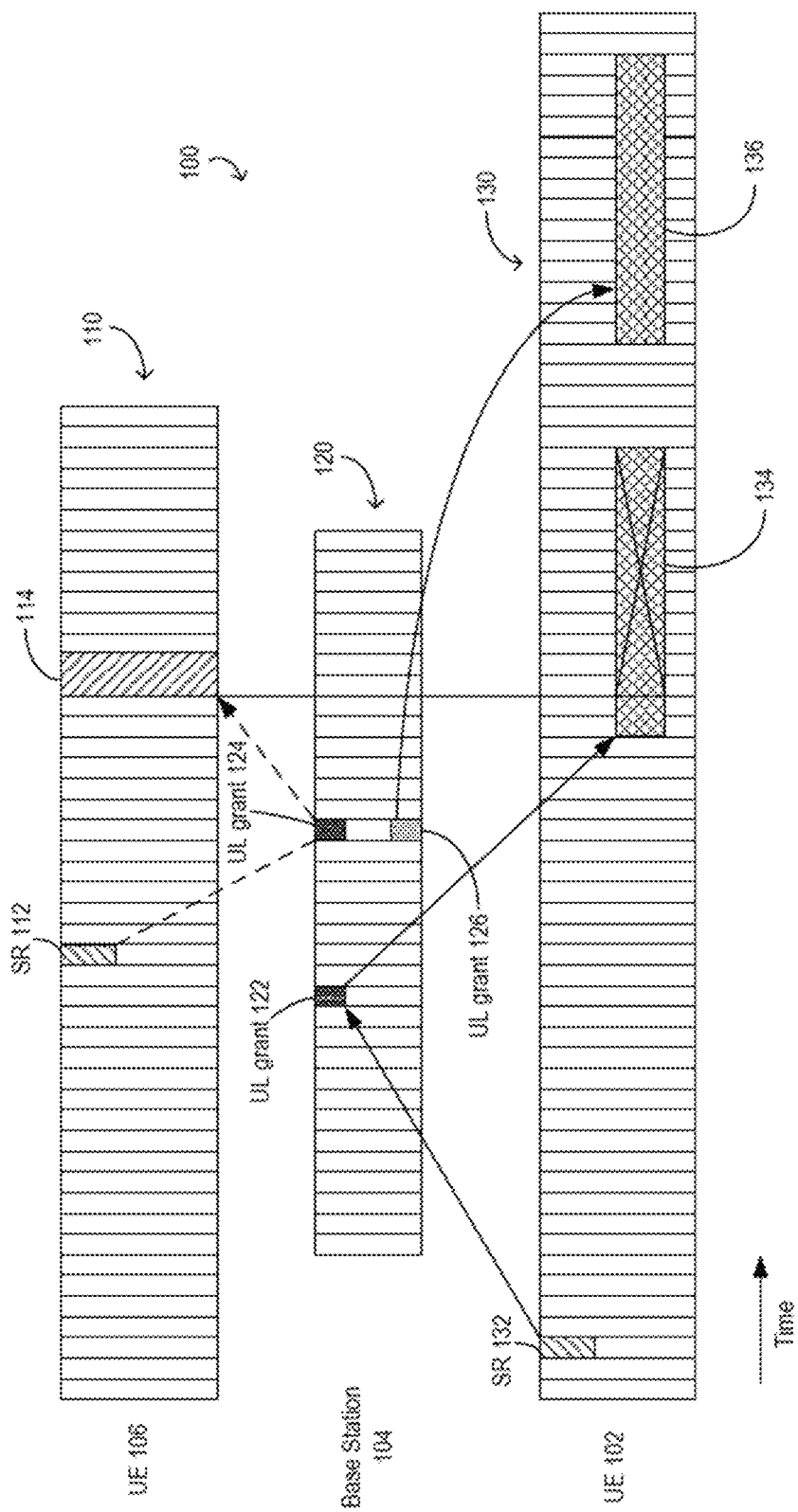
FIG. 1 is a schematic diagram illustrating physical uplink shared channel (PUSCH) resource being canceled, in accordance with some embodiments of the present disclosure.

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

In order to support ultra-high reliability and ultra-low-latency transmission, high-reliability and low-latency services are transmitted within a relatively short transmission time interval. In transmitting such high-reliability and low-latency services, at least a portion of resources for transmitting other services with longer transmission time intervals (that have not yet been transmitted or that are being transmitted) can be preempted, given that the high-reliability and low-latency services may have priorities higher than priorities of the other services with the longer transmission time intervals. In this situation, different user terminals performing uplink transmission may not be aware of such transmission resource preemption. To minimize the performance impact on high-reliability and low-latency services in this situation, preemption indication information needs to be conveyed to the user terminals that may have transmission resources preempted. Based on such preemption indication information, uplink transmissions of services that have a relatively long transmission time interval or relatively low reliability can accordingly be canceled (if not yet transmitted) or stopped (while being transmitted), thus avoiding performance degradation resulting from simultaneously transmitting both types of services using the same uplink transmission resource.

Currently, with respect to downlink transmission resource preemption, configured reference downlink transmission resource is partitioned into 14 blocks, for example, using $\{M, N\}=\{14, 1\}$ or $\{7, 2\}$. A bitmap that maps bits (indicative of preemption status) unto the blocks is used to indicate whether each of the blocks is preempted. M represents a number of partitions of the reference DL resource in the time domain. N represents a number of partitions of the reference DL resource in the frequency domain.

With respect to uplink transmission resource preemption, a conventional solution is using an uplink cancelation indication (UL CI). In response to a user equipment (UE) receiving an uplink CI and determining that an uplink transmission resource indicated by the UL CI overlaps with an uplink transmission resource of the UE, the UE cancels the uplink transmission on the uplink transmission resource of the UE (if the uplink transmission has not yet been transmitted) or interrupts the uplink transmission on the uplink transmission resource of the UE (if the uplink transmission is being transmitted).

The canceled or interrupted uplink transmission may contain UCI carried on a PUCCH or a PUSCH. For example, the canceled UCI contains hybrid automatic repeat request—acknowledgement (HARQ-ACK) information corresponding to a physical downlink shared channel (PDSCH). The HARQ-ACK information indicates a reception state (whether the downlink transmissions carried in the PDSCH corresponding to the HARQ-ACK has been received by the UE). In this situation, given that the base station is not notified of the reception state of downlink transmissions in the PDSCH, the base station triggers retransmission of all downlink transmissions corresponding to the canceled UCI, thus greatly reducing the downlink transmission efficiency. In another example in which the canceled UCI contains channel state information (CSI) related to downlink scheduling, the base station cannot accurately perform downlink scheduling.

The present disclosure addresses the loss of UCI caused by the preemption of uplink transmission resources and the reduction in downlink data transmission efficiency due to the cancelation of uplink transmission resource used to transmit the UCI. In particular, the disclosed information transmission methods, apparatuses, and systems effectively restore transmission of the UCI, thus avoiding the reduction of downlink data transmission efficiency caused by the cancelation of the UCI.

In some implementations, with regard to uplink inter-UE multiplexing, power control can be used to provide transmission reliability of high-priority services by dynamically increasing transmission power use to transmit the high-priority services. Specifically, in some examples, an open-loop power control parameter set indicator (OLI) field (e.g., an N bit) is introduced in the scheduling downlink control information (DCI) of the high-priority service. Considering a sounding reference signal (SRS) resource indicator (SRI) field which is also used to indicate open-loop power control parameter set in the scheduling DCI, the adopted open-loop power control parameter set can be determined using various methods.

In a first method, a list of open-loop power control parameter sets is configured using RRC signaling. The list of open-loop power control parameter sets is configured to include M subsets. The SRI indicates a subset of the list of open-loop power control parameter set. In some examples, the OLI indicates an open-loop power control parameter set in the subset. The open-loop power control parameter set includes at least one of a received power P0 expected by a base station and a path-loss compensation coefficient $\alpha$. In the examples in which the scheduled DCI does not contain an SRI field, a first subset of the list of open-loop power control parameter set is selected by default, and the OLI indicates the open-loop power control parameter set in the first subset.

In a second method, a list of open-loop power control parameter sets is configured using RRC signaling. The list of open-loop power control parameter sets is configured to include M subsets. The OLI indicates a subset of the list of open-loop power control parameter sets. In some examples, the SRI indicates an open-loop power control parameter set in the subset. The open-loop power control parameter set includes at least one of a received power P0 expected by a base station and a path-loss compensation coefficient $\alpha$. In the examples in which the scheduled DCI does not contain an SRI field, the OLI indicates a subset of the list open-loop power control parameter sets. A first configuration in the subset (identified by the OLI) of the open-loop power control parameter set is set as the open loop power control parameter by default.

In a third method, a list of open-loop power control parameter sets is configured using RRC signaling. The SRI indicates an open-loop power control parameter set of the list of open-loop power control parameter sets. The OLI indicates an offset (e.g., an adjustment amount) $\Delta P0$ of received power P0 expected by a base station. The set of values of $\Delta P0$ is configured by RRC signaling. In the examples in which the scheduled DCI does not contain an SRI field, a first configuration of the list of open-loop power control parameter sets (configured using RRC) is used by default. The final, adopted open loop power control parameter set is determined using the offset indicated by the OLI. In other examples, the OLI can be defined as an offset (e.g., an adjustment amount) $\Delta\alpha$ of the path-loss compensation coefficient $\alpha$. In addition, the set of values of $\Delta\alpha$ is configured by RRC signaling correspondingly. In other examples, the OLI can be defined as an offset (e.g., an adjustment amount) $(\Delta P0, \Delta\alpha)$ of the received power P0 expected by a base station and the path-loss compensation coefficient α. The set of values of (ΔP0, Δα) is configured by RRC signaling correspondingly.

In other implementations, the uplink inter-UE multiplexing can be implemented by canceling transmissions of low-priority services. FIG. 1 is a schematic diagram illustrating a process 100 by which a physical uplink shared channel (PUSCH) uplink transmission resource is canceled, in accordance with some embodiments of the present disclosure. Referring to FIG. 1, the process 100 involves a UE 102, a base station 104 (e.g., a gNodeB or gNB), and a UE 106. An uplink transmission diagram 130 illustrates uplink activities for the UE 102. An uplink transmission diagram 110 illustrates uplink transmission activities for the UE 106. A downlink transmission diagram 120 illustrates downlink activities of the base station 104. The diagrams 110, 120, and 130 show slots divided in the time domain (denoted by the x-axis). In some examples, the dimension or axis of each of the diagrams 110, 120, and 130 that is perpendicular to the time domain axis represents frequency such as but not limited to, a bandwidth, an active uplink bandwidth part (BWP), and so on, although frequency is discontinuous across the different diagrams 110, 120, and 130.

The UE 102 sends a scheduling request (SR) 132 to the base station 104. The SR 132 requests the base station 104 for uplink transmission resource for uplink service such as but not limited to, an enhanced mobile broadband (eMBB) service. The base station 104 allocates the uplink transmission resource (e.g., a PUSCH 134) for the UE 102 via uplink grant (UL grant) 122. The base station 104 sends the UL grant 122 to the UE 102 to notify the UE 102 that the UE 102 can transmit the uplink service using the PUSCH 134.

After the UE 102 sends the SR 132 to the base station 104, and after the base station 104 sends the UL grant 122 to the UE 102, the UE 106 sends an SR 112 to the base station 104. The SR 132 requests the base station 104 for uplink transmission resource for uplink service such as but not limited to, an ultra-reliable low latency communications (URLLC) service. Given that the uplink service (e.g., the URLLC service) of the UE 106 has ultra-high reliability and ultra-low-latency transmission requirements, the base station 104 allocates uplink transmission resource that is as early in time as possible. The base station 104 determines that the uplink transmission resource (e.g., a PUSCH 114) that satisfies the ultra-high reliability and ultra-low-latency transmission requirements may have already been allocated to the UE 102. That is, the base station 104 determines that at least a portion of the PUSCH 134 collides (e.g., overlaps in time) with at least a portion of the PUSCH 114. In response to determining that the priority of the uplink service (e.g., the URLLC service) of the UE 106 is higher than the priority of the uplink service (e.g., the eMBB service) of the UE 102, the base station 104 cancels the transmission of the UE 102 on the previously allocated uplink transmission resource (e.g., the PUSCH 134).

The low-priority uplink transmission can be canceled using various methods. In one example, the base station 104 reschedules a new uplink transmission resource (e.g., PUSCH 136) for the UE 102 and then cancels the uplink transmission on the originally allocated uplink transmission resource (e.g., the PUSCH 134). The base station 104 can retransmit a UL grant 126 to the UE 102 to notify the UE 102 that the UE 102 can transmit the uplink service using the PUSCH 136 (e.g., the transmission is rescheduled to another uplink transmission resource PUSC 136). In some examples, the base station 104 can transmit the UL grant 126 at the same time (e.g., within a same time slot) as the UL grant 124, using different frequency resources. The HARQ process identifier (ID) of the UL grant 126 is the same as the HARQ process ID of the UL grant 122. A new data indicator (NDI) field of the UL grant 126 is toggled, thus indicating that the uplink grant 126 corresponds to the uplink service (e.g., the eMBB service) for which uplink transmission resource (e.g., the PUSCH 134) was previously allocated and that the previously allocated uplink transmission resource (e.g., the PUSCH 134) is released. In some examples, the entire originally allocated uplink transmission resource (e.g., the PUSCH 134) or a portion thereof can be rescheduled and released using such method. Also, an entire transport block (TB) or a portion thereof can be transmitted using the new uplink transmission resource (e.g., the PUSCH 136).

In another example, the base station 104 can notify the UE 102 that the originally allocated uplink transmission resource (e.g., the PUSCH 134) is preempted by the high-priority service transmission using cancelation indication signaling (e.g., the UL CI). Accordingly, the UE 102 cancels the transmission on the preempted resource (e.g., the PUSCH 134) in response to receiving the cancelation indication signaling. The cancelation indication signaling can be carried in the physical DCI on the downlink control channel or another specific signal sequence.

In yet another example, the base station 104 can instruct the UE 102 to reduce transmission power to zero on the entire originally allocated uplink transmission resources (e.g., the PUSCH 134) or a portion thereof, to indirectly cancel the transmission on the entire originally allocated uplink transmission resource (e.g., the PUSCH 134) or a portion thereof, respectively. Accordingly, in response to receiving transmission power reduction commands/signals from the base station 104, the UE 102 cancels transmission on the entire originally allocated uplink transmission resource (e.g., the PUSCH 134) or a portion thereof In some implementations, the UCI of the low-priority service (such as but not limited to, the eMBB service of the UE 102 or low-priority services of the URLLC services) can be carried on the PUCCH. Transmission of a high-priority service (such as but not limited to, high-priority services of the URLLC services) may preempt the uplink transmission resources occupied by the PUCCH, thus causing transmission of the low-priority service on the PUCCH to be canceled. Accordingly, the UCI may not be transmitted due to such preemption.

The UCI includes one or more of HARQ-ACK feedback information, SR information, CSI, and so on. Different types of UCI are separately configured PUCCH transmission resources. In the example in which the PUCCH transmission resources of two or more types of UCI overlap in the time domain, (bits of) the different types of UCI are multiplexed according to predefined rules to generate multiplexed UCI. The PUCCH resource on which the multiplexed UCI (containing the different types of the UCI) is transmitted is referred to herein as the final PUCCH.

Figure 2:
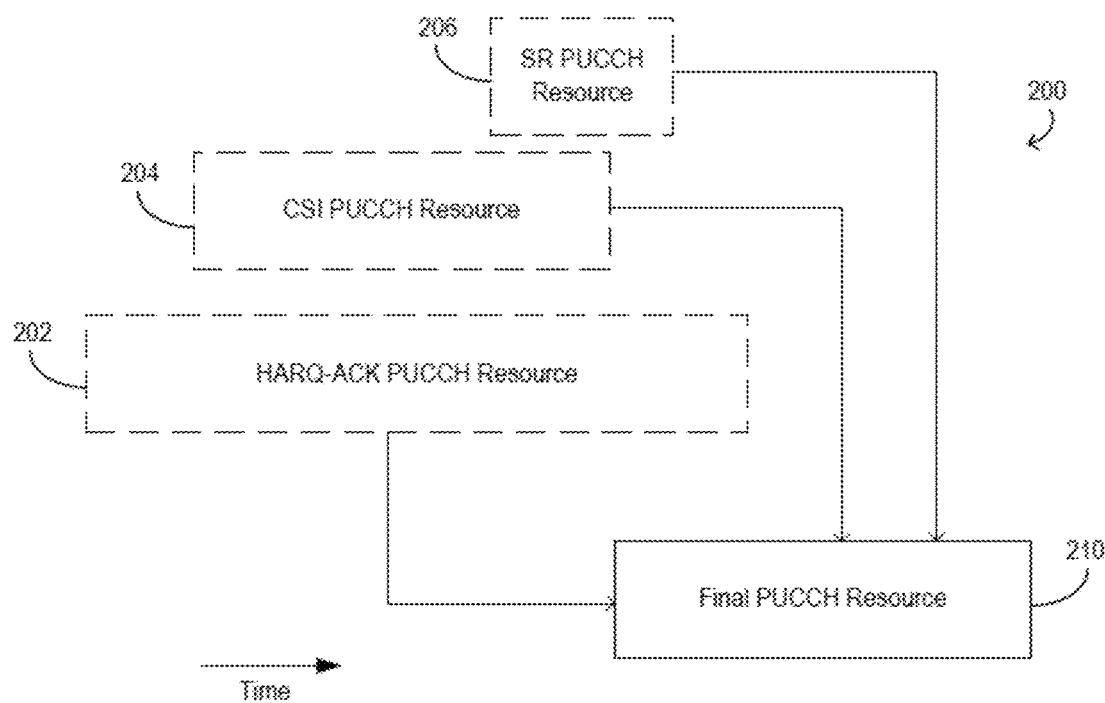
FIG. 2 is a schematic diagram illustrating a method for determining a final physical uplink control channel (PUCCH) resource for transmitting uplink control information (UCI), in accordance with some embodiments of the present disclosure.

FIG. 2 is a schematic diagram illustrating a method 200 for determining a final PUCCH resource 210 for transmitting UCI, in accordance with some embodiments of the present disclosure. Referring to FIG. 2, the different types of UCI include HARQ-ACK, CSI, and SR. The HARQ-ACK, the CSI, and the SR are separately configured with PUCCH resources—HARQ-ACK PUCCH resource 202, CSI PUCCH resource 204, and SR PUCCH resource 206, respectively. In response to determining that the PUCCH resources 202, 204, and 206 overlap with one another in the time-domain, the bits of the HARQ-ACK, the CSI, and the SR are multiplexed together to generate a multiplexed UCI. The final PUCCH resource 210 on which the multiplexed UCI is transmitted is re-determined.

In some examples, the final PUCCH resource 210 is determined by selecting a PUCCH resource set according to a number of bits of the multiplexed UCI. A PUCCH resource is selected from the PUCCH resource set according to the indication in the scheduling DCI of the last PDSCH corresponding to the HARQ-ACK. A PUCCH format is determined according to the indication in the scheduling DCI of the last PDSCH corresponding to the HARQ-ACK. The UE can transmit the multiplexed UCI on the final PUCCH resource 210. The PUCCH resource and format of the PUCCH resource used to transmit the HARQ-ACK multiplexed with either of the CSI or the SR can be determined using a similar method.

Figure 3:
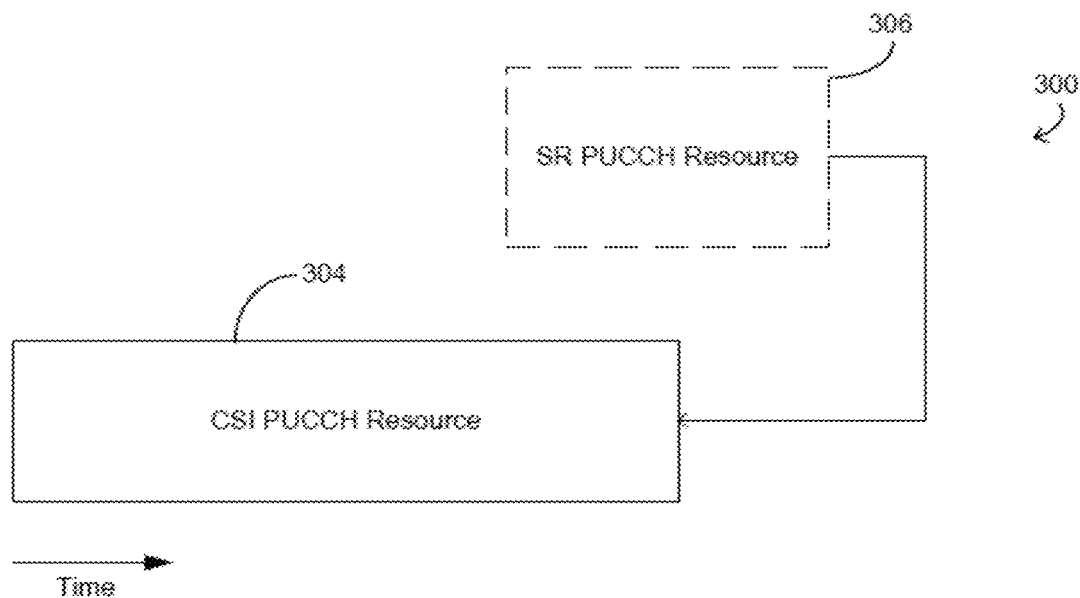
FIG. 3 is a schematic diagram illustrating a method for determining a PUCCH resource for transmitting UCI, in accordance with some embodiments of the present disclosure.

FIG. 3 is a schematic diagram illustrating a method 300 for determining a PUCCH resource (e.g., a CSI PUCCH resource 304) for transmitting UCI, in accordance with some embodiments of the present disclosure. Referring to FIG. 3, the method 300 is concerned with multiplexing types of UCI other than the HARQ-ACK. As shown, two different types of UCI (other than the HARQ-ACK) such as but not limited to, the CSI and the SR are separately configured with PUCCH resources—CSI PUCCH resource 304 and SR resource PUCCH 306, respectively. In response to determining that the PUCCH resources 304 and 306 overlap with one another in the time-domain, the bits of the CSI and the SR are multiplexed together to generate a multiplexed UCI. The UE transmits the multiplexed UCI using the CSI PUCCH resource 304. That is, the CSI PUCCH resource 304 is selected to be the final PUCCH resource on which the multiplexed UCI is transmitted.

In other implementations, the UE transmits the UCI on a PUSCH. For example, in response to determining that the PUCCH carrying the UCI (e.g., including HARQ-ACK feedback information, the SR information, the CSI, and so on) overlaps with a scheduled PUSCH of the UE in the time domain, the UE transmits the UCI on a portion of the PUSCH resource. The UCI and the uplink data are independently encoded. The encoded UCI is mapped to the portion of the PUSCH resource determined according to predefined rules. Given that the portion of the PUSCH resource is occupied by the UCI, the PUSCH is transmitted using puncturing or rate matching transmission, and uplink data is mapped on a remaining portion of the PUSCH resource that is not occupied by the UCI.

Accordingly, in response to determining that UCI transmission on the PUSCH or PUCCH is canceled in the manner described herein (especially in the examples in which the UCI includes HARQ-ACK feedback information), the UCI can be retransmitted (e.g., the UCI transmission is restored). The scenarios in which cancelation of transmission on the PUSCH or the PUCCH due to collision with high-priority service transmissions occurs are used for illustrative purposes. The cancelation of transmissions on the PUSCH resource or the PUCCH resource can be caused by other reasons. For example, transmissions on the PUSCH resource or the PUCCH resource can be canceled if determined to be in conflict with the frame structure configurations. In another example, transmissions on the PUSCH resource or the PUCCH resource can be canceled due to collisions with other uplink transmissions of the same UE or a different UEs. In yet another example, transmissions on the PUSCH resource or the PUCCH resource can be canceled due to power limitations of the UE (e.g., the UE does not have sufficient power to transmit data on the PUSCH resource or the PUCCH resource.

Figure 4:
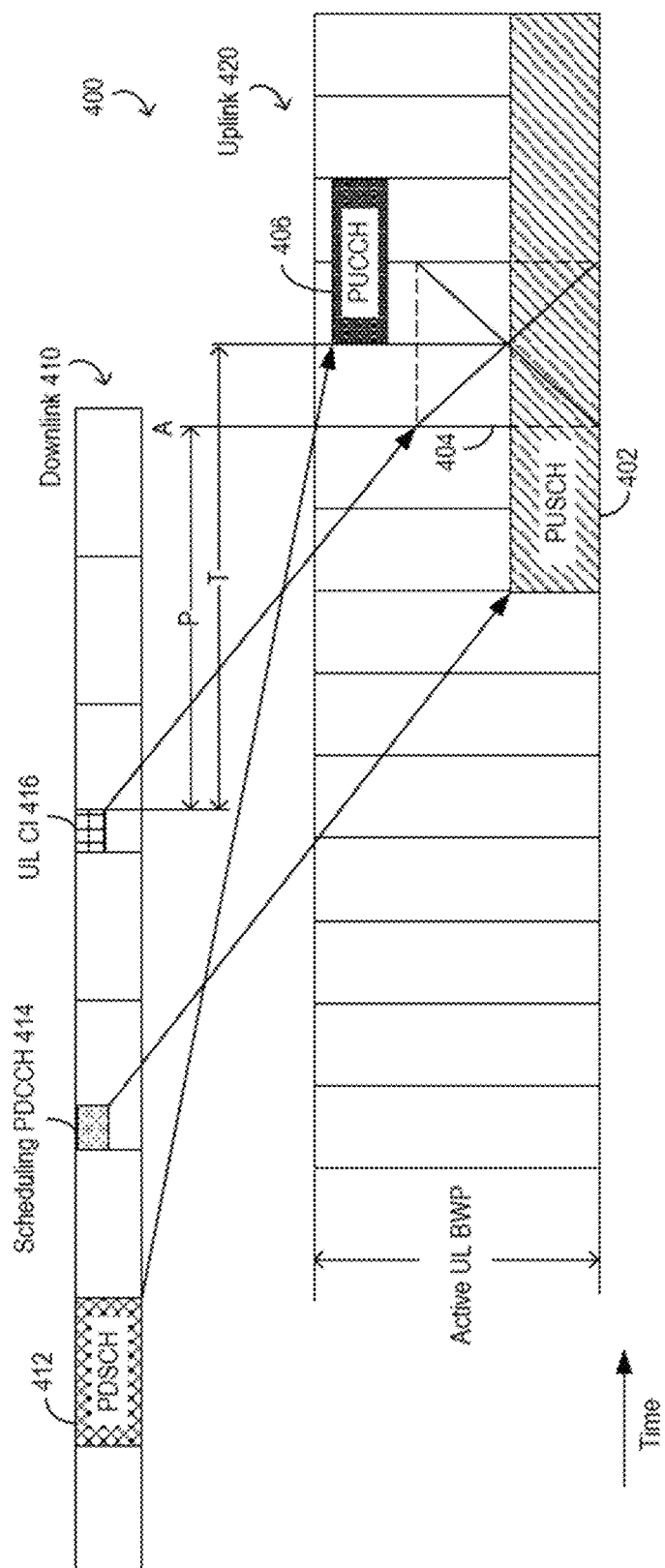
FIG. 4 is a schematic diagram illustrating a method for restoring UCI transmission, in accordance with some embodiments of the present disclosure.

FIG. 4 is a schematic diagram illustrating a method 400 for restoring UCI transmission, in accordance with some embodiments of the present disclosure. Referring to FIGS. 1-4, the method 400 involves downlink activities of a UE (shown in a downlink transmission diagram 410) and uplink activities of the UE (shown in the uplink transmission diagram 420). The diagrams 410 and 420 show slots in the time domain (denoted by the x-axis). In some examples, the dimension or axis of each of the diagrams 410 and 420 that is perpendicular to the time domain axis represents frequency such as but not limited to, a bandwidth, an active uplink BWP, and so on, although frequency is discontinuous across the different diagrams 410 and 420.

As shown in FIG. 4, the UE receives a downlink transmission on PDSCH 412 from a network (e.g., a base station). The UE is originally instructed to transmit UCI on uplink transmission resource PUCCH 406. In some examples, the UCI includes feedback information (e.g., HARQ-ACK feedback information) that provides feedback for the PDSCH 412. The UE receives the uplink scheduling PDCCH 414, which schedules transmission on uplink transmission resource PUSCH 402. In response to determining that the PUCCH 406 and the PUSCH 402 overlap in the time domain, the UCI (originally to be transmitted using the PUCCH 406) is multiplex with uplink data to be transmitted using the PUSCH 402 to generate multiplexed data, in some examples. The UE determines to transmit the multiplexed data (including the UCI) on the PUSCH 402. In some examples, the UCI is mapped to a portion of the PUSCH 402 according to predefined rules. The PUSCH 402 and the PUCCH 406 overlap in the time domain while occupy different frequency bandwidths (e.g., different frequency resources) in the active UL BWP.

The UE subsequently receives UL CI 416 from the network (e.g., the base station). The UL CI 416 indicates that at least a portion of the PUSCH 402 is canceled. In one example, the reason for the cancelation may be that transmission on uplink resource 404 (by another UE or by the same UE) collides with at least a portion of the PUSCH 402, given that the uplink resource 404 and a portion of the PUSCH 402 overlap with each other. Responsive to the UL CI 416, the UE determines to cancel the transmission on the PUSCH 402. In some examples, the UE cancels the transmission on a canceled portion of the PUSCH 402. The canceled portion of the PUSCH 402 is the portion indicated by the UL CI 416 to be canceled (e.g., the portion that overlaps with the uplink resource 404 in the time domain) and any remaining portion that is after the portion indicated by the UL CI 416 in the time domain. As shown, the canceled portion of the PUSCH 402 starts from time point A and ends when the PUSCH 402 ends. In other words, the UE cancels any uplink transmission on the PUSCH 402 that occurs after time point A (point in time). The UE does not cancel any uplink transmission on the PUSCH 402 that occurs before time point A.

The UCI may be originally scheduled to be transmitted on the canceled portion of the PUSCH 402. A processing time (e.g., N symbols) is needed to process (e.g., decode) the UL CI 416 and to cancel the transmission on the canceled portion of the PUSCH 402. A time interval P denotes a time interval between the end of the UL CI 416 (e.g., the end of the last symbol of the UL CI 416) and the beginning of the canceled portion of the PUSCH 402 (e.g., the start of the first symbol of the canceled portion of the PUSCH 402). If the time interval P is greater than the processing time, the UE can successfully cancel the transmission on the canceled portion of the PUSCH 402. On the other hand, if the time interval P is less than the processing time, the UE may not successfully cancel the transmission on the canceled portion of the PUSCH 402

In the method 400, the PUCCH 406 is not canceled. In some examples, the PUCCH 406 is not allowed to be canceled by any uplink transmission with higher priorities. In some examples, although the PUCCH 406 is allowed to be canceled, given that the PUCCH 406 does not collide with any uplink transmission with a higher priority and that the start of the first symbol of the PUCCH 406 is no earlier than time point A, the PUCCH 406 is not canceled.

The UE determines whether the UCI can be retransmitted on the PUCCH 406. A time interval from the end of the last symbol of the UL CI 416 to the start of the first symbol of the PUCCH 406 is defined as time interval T. In response to determining that the time interval T is greater than or equal to a time interval defined as the length of time needed by the UE to decode the UL CI 416 and to prepare transmitting the UCI on the PUCCH 406, the UE determines to transmit the UCI on the PUCCH 406. On the other hand, in response to determining that the time interval T is less than the time needed by the UE to decode the UL CI 416 and to prepare transmitting the UCI on the PUCCH 406, the UE cannot complete decoding the UL CI 416 and preparing to transmit the UCI on the PUCCH 406, and therefore determines to not transmit the UCI on the PUCCH 406.

Alternatively, the UE determines to transmit the UCI on the PUCCH 406 in response to determining that transmission on the PUCCH 406 is not canceled and that the start of the first symbol of the PUCCH 406 is at or no earlier than time point A.

Figure 5:
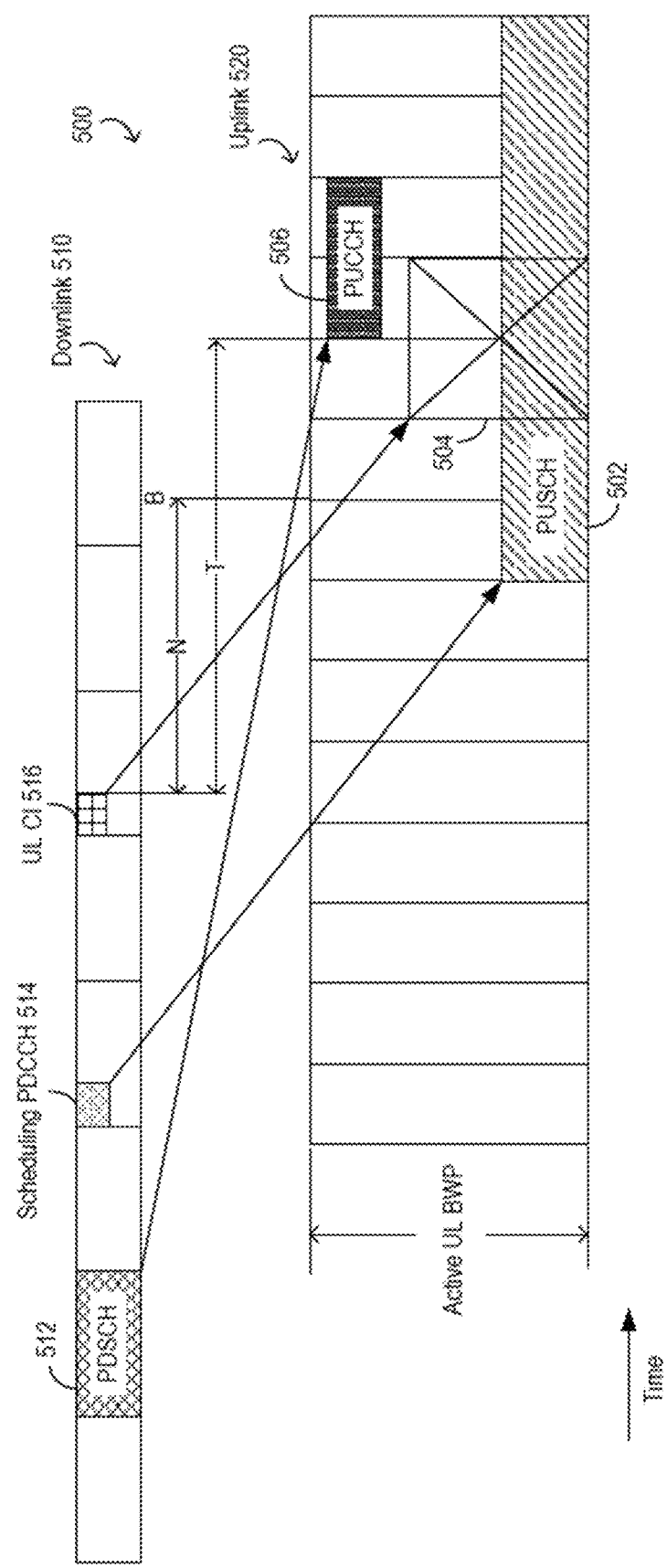
FIG. 5 is a schematic diagram illustrating a method for restoring UCI transmission, in accordance with some embodiments of the present disclosure.

FIG. 5 is a schematic diagram illustrating a method 500 for restoring UCI transmission, in accordance with some embodiments of the present disclosure. Referring to FIGS. 1-5, the method 500 involves downlink activities of a UE (shown in a downlink transmission diagram 510) and uplink activities of the UE (shown in the uplink transmission diagram 520). The diagrams 510 and 520 show slots in the time domain (denoted by the x-axis). In some examples, the dimension or axis of each of the diagrams 510 and 520 that is perpendicular to the time domain axis represents frequency such as but not limited to, a bandwidth, an active uplink BWP, and so on, although frequency is discontinuous across the different diagrams 510 and 520.

As shown in FIG. 5, the UE receives a downlink transmission on PDSCH 512 from a network (e.g., a base station). The UE is originally instructed to transmit UCI on uplink transmission resource PUCCH 506. In some examples, the UCI includes feedback information (e.g., HARQ-ACK feedback information) that provides feedback for the PDSCH 512. The UE receives the uplink scheduling PDCCH 514, which schedules transmission on uplink transmission resource PUSCH 502. In response to determining that the PUCCH 506 and the PUSCH 502 overlap in the time domain, the UCI (originally to be transmitted using the PUCCH 506) is multiplex with data bits to be transmitted using the PUSCH 502 to generate multiplexed data, in some examples. The UE determines to transmit the multiplexed data (including the UCI) on the PUSCH 502. In some examples, the UCI is mapped to a portion of the PUSCH 502 according to predefined rules. The PUSCH 502 and the PUCCH 506 overlap in the time domain while occupy different frequency bandwidths (e.g., different frequency resources) in the active UL BWP.

The UE subsequently receives UL CI 516 from the network (e.g., the base station). The UL CI 516 indicates that at least a portion of the PUSCH 502 is canceled. In one example, the reason for the cancelation may be that transmission on uplink resource 504 (by another UE or by the same UE) collides with at least a portion of the PUSCH 502, given that the uplink resource 504 and a portion of the PUSCH 502 overlap in the time domain. Responsive to the UL CI 516, the UE determines to cancel the transmission on the PUSCH 502.

The UCI may be originally scheduled to be transmitted on a canceled portion of the PUSCH 502. A processing time (e.g., N symbols) is needed by the UE to process (e.g., decode) the UL CI 516 and to cancel the transmission on the canceled portion of the PUSCH 502. If a time interval between the end of the UL CI 516 (e.g., after the end of the last symbol of the UL CI 516) and the beginning of the canceled portion of the PUSCH 502 (e.g., before the start of the first symbol of the canceled portion of the PUSCH 502) is greater than the processing time, the UE can successfully cancel the transmission on the canceled portion of the PUSCH 502. On the other hand, if the time interval between the end of the UL CI 516 and the beginning of the canceled portion of the PUSCH 502 is less than the processing time, the UE may not successfully cancel the transmission on the canceled portion of the PUSCH 502

The UE cancels the uplink transmission on a canceled portion of the PUSCH 502. In some examples, the UE cancels the portion of the PUSCH 502 that is N symbols after the end of the UL CI 516 (e.g., after the end of the last symbol of the UL CI 516). As shown, the canceled portion of the PUSCH 502 starts from time point B and ends when the PUSCH 502 ends. In other words, the UE cancels any uplink transmission on the PUSCH 502 that occurs after time point B (point in time). The UE does not cancel any uplink transmission on the PUSCH 502 that occurs before time point B.

In the method 500, the PUCCH 506 is not canceled. In some examples, the PUCCH 506 is not allowed to be canceled by any uplink transmission with higher priorities. In some examples, although the PUCCH 506 is allowed to be canceled, given that the PUCCH 506 does not collide with any uplink transmission with a higher priority and that the start of the first symbol of the PUCCH 506 is no earlier than time point B, the PUCCH 506 is not canceled.

The UE determines whether the UCI can be retransmitted on the PUCCH 506. A time interval from the end of the last symbol of the UL CI 516 to the start of the first symbol of the PUCCH 506 is defined as time interval T. In response to determining that the time interval T is greater than or equal to a time interval defined as the length of time needed by the UE to decode the UL CI 516 and to prepare transmitting the UCI on the PUCCH 506, the UE determines to transmit the UCI on the PUCCH 506. On the other hand, in response to determining that the time interval T is less than the time needed by the UE to decode the UL CI 516 and to prepare transmitting the UCI on the PUCCH 506, the UE cannot complete decoding the UL CI 516 and preparing to transmit the UCI on the PUCCH 506, and therefore determines to not transmit the UCI on the PUCCH 506.

Alternatively, the UE determines to transmit the UCI on the PUCCH 506 in response to determining that transmission on the PUCCH 506 is not canceled and that the start of the first symbol of the PUCCH 406 is at or no earlier than time point B.

Figure 6:
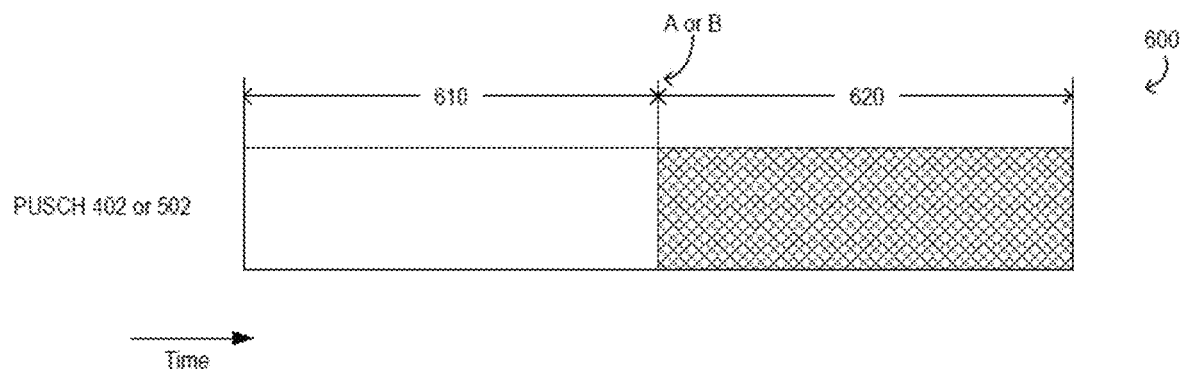
FIG. 6 is a schematic diagram illustrating a method for restoring UCI transmission, in accordance with some embodiments of the present disclosure.

FIG. 6 is a schematic diagram illustrating a method 600 for restoring UCI transmission, in accordance with some embodiments of the present disclosure. Referring to FIGS. 1-6, as described with respect to FIGS. 4 and 5, the UE cancels transmission on the canceled portion of the PUSCH 402 or the PUSCH 502 according to the UL CI 416 or 516. Specifically, the UE cancels transmission on the portion of the PUSCH 402 that is after time point A. The UE cancels transmission on the portion of the PUSCH 502 that is after time point B. The portions of the PUSCH 402 and the PUSCH 502 before the time points A and B, respectively, can still be used to transmit data. As shown in FIG. 6, the PUSCH 402 or the PUSCH 502 includes a transmitted portion 610 and a canceled portion 620. The canceled portion 620 corresponds to the portion of the PUSCH 402 that is after time point A or the portion of the PUSCH 502 that is after time point B.

The UE determines whether all of the bits of the UCI are transmitted on the transmitted portion 610 of the PUSCH 402 or 502. That is, in response to determining that the complete UCI (e.g., all of the bits of the UCI) is transmitted on the transmitted portion 610 of the PUSCH 402 or 502, the UE does not need to transmit any portion of the UCI on the PUCCH 406 or 506.

In response to determining that the complete UCI is not transmitted on the transmitted portion 610 (e.g., not all of the bits of the UCI are transmitted on the transmitted portion 610), the UE determines whether the UCI can be transmitted on the PUCCH 406 or 506. In some implementations, in response to determining that the PUCCH 406 or 506 is not canceled, that a start of the first symbol of the PUCCH 406 or 506 is after time point A or point B, respectively, and that the time interval T (e.g., the time interval from the end of the last symbol of the UL CI 416 or 516 to the start of the first symbol of the PUCCH 406 or 506, respectively) is greater than or equal to the time required for the UE to decode the UL CI 416 or 516 and prepare the PUCCH transmission, the UE determines that the UCI is transmitted on the PUCCH 406 or 506, respectively. On the other hand, in response to determining that the PUCCH 406 or 506 is canceled, that the start of the first symbol of the PUCCH 406 or 506 is before time point A or point B, respectively, or that the time interval T is less than the time required for the UE to decode the UL CI 416 or 516 and prepare the PUCCH transmission, the UE determines that the UCI is not transmitted on the PUCCH 406 or 506.

Alternatively, in response to determining that the complete UCI is not transmitted on the transmitted portion 610, the UE determines whether the UCI can be transmitted on the PUCCH 406 or 506. In response to determining that the PUCCH 406 or 506 is not canceled and that the start of the first symbol of the PUCCH 406 or 506 is no earlier than time point A or time point B, respectively, the UE determines that the UCI is transmitted on the PUCCH 406 or 506. In some examples, the bits of the UCI that have not been transmitted in the transmitted portion 610 are transmitted on the PUCCH 406 or 506. In some examples, all the bits of the UCI are transmitted on the PUCCH 406 or 506. On the other hand, in response to determining that the PUCCH 406 or 506 is canceled or that the start of the first symbol of the PUCCH 406 or 506 is earlier than time point A or time point B, respectively, the UE determines that the UCI is not transmitted on the PUCCH 406 or 506.

In some embodiments, as described with respect to FIGS. 4 and 5, the UE cancels transmission on the canceled portion of the PUSCH 402 or the PUSCH 502 according to the UL CI 416 or 516. Specifically, the UE cancels transmission on the portion of the PUSCH 402 that is after time point A. The UE cancels transmission on the portion of the PUSCH 502 that is after time point B. The portions of the PUSCH 402 and the PUSCH 502 before the time points A and B, respectively, can still be used to transmit data.

In some examples in which the UCI to be transmitted includes two or more different types of UCI (e.g., two or more different ones of HARQ-ACK, SR, and CSI), the UE determines whether all bits of each type of UCI are transmitted in the portion of the PUSCH 402 before the time point A or in the portion of the PUSCH 502 before the time point B. While the HARQ-ACK is used for illustrative purposes, a same process can be executed for other types of UCI such as but not limited to, the SR and the CSI.

In some implementations, UE determines whether all of the bits of the HARQ-ACK are transmitted on the transmitted portion of the PUSCH 402 or 502. In response to determining that the complete HARQ-ACK (e.g., all of the bits of the HARQ-ACK) is transmitted on the transmitted portion of the PUSCH 402 or 502, the UE does not need to transmit any portion of the HARQ-ACK on the PUCCH 406 or 506.

In response to determining that the complete HARQ-ACK of the UCI is not transmitted on the transmitted portion of the PUSCH 402 or 502 (e.g., not all of the bits of the HARQ-ACK are transmitted on the transmitted portion of the PUSCH 402 or 502), the UE determines whether the HARQ-ACK can be transmitted on the PUCCH 406 or 506. In response to determining that the PUCCH 406 or 506 is not canceled and that the start of the first symbol of the PUCCH 406 or 506 is no earlier than time point A or time point B, respectively, the UE determines that the HARQ-ACK is transmitted on the PUCCH 406 or 506. In some examples, the bits of the HARQ-ACK that have not been transmitted in the transmitted portion of the PUSCH 402 or 502 are transmitted on the PUCCH 406 or 506. In some examples, all the bits of the HARQ-ACK are transmitted on the PUCCH 406 or 506. On the other hand, in response to determining that the PUCCH 406 or 506 is canceled or that the start of the first symbol of the PUCCH 406 or 506 is earlier than time point A or time point B, respectively, the UE determines that the HARQ-ACK is not transmitted on the PUCCH 406 or 506.

Alternatively, in some implementations, in response to determining that the complete HARQ-ACK is not transmitted on the transmitted portion of the PUSCH 402 or 502 (e.g., not all of the bits of the HARQ-ACK are transmitted on the transmitted portion of the PUSCH 402 or 502), the UE determines whether the HARQ-ACK can be transmitted on the PUCCH 406 or 506. For example, in response to determining that the PUCCH 406 or 506 is not canceled, that a start of the first symbol of the PUCCH 406 or 506 is after time point A or point B, respectively, and that the time interval T (e.g., the time interval from the end of the last symbol of the UL CI 416 or 516 to the start of the first symbol of the PUCCH 406 or 506, respectively) is greater than or equal to the time required for the UE to decode the UL CI 416 or 516 and prepare the PUCCH transmission, the UE determines that the HARQ-ACK is transmitted on the PUCCH 406 or 506, respectively. On the other hand, in response to determining that the PUCCH 406 or 506 is canceled, that the start of the first symbol of the PUCCH 406 or 506 is before time point A or point B, respectively, or that the time interval T is less than to the time required for the UE to decode the UL CI 416 or 516 and prepare the PUCCH transmission, the UE determines that the HARQ-ACK is not transmitted on the PUCCH 406 or 506.

In some embodiments, the UE cancels transmission on the canceled portion of the PUSCH 402 or the PUSCH 502 according to the UL CI 416 or 516. Specifically, the UE cancels transmission on the portion of the PUSCH 402 that is after time point A. The UE cancels transmission on the portion of the PUSCH 502 that is after time point B. The portions of the PUSCH 402 and the PUSCH 502 before the time points A and B, respectively, can still be used to transmit data. As shown in FIG. 6, the PUSCH 402 or the PUSCH 502 includes the transmitted portion 610 and the canceled portion 620, where data can be transmitted on the transmitted portion 610.

In some examples in which the UCI to be transmitted includes two or more different types of UCI (e.g., two or more different ones of HARQ-ACK, SR, and CSI), the UE determines whether all bits of each type of UCI are transmitted in the transmitted portion 610 (e.g., the portion of the PUSCH 402 before the time point A or in the portion of the PUSCH 502 before the time point B). In one scenario, all bits of one or more types of the UCI (e.g., all bits of the HARQ-ACK) can be transmitted on the transmitted portion 610, and all bits of other types of the UCI (e.g., all bits of the CSI and SR) cannot be transmitted on the transmitted portion 610, the UE determines whether to use the PUCCH to transmit the other types of the UCI for which transmission is incomplete.

As described with respect to FIG. 2, the different types of UCI include HARQ-ACK, CSI, and SR. The HARQ-ACK, the CSI, and the SR are separately configured with PUCCH resources—the HARQ-ACK PUCCH resource 202, the CSI PUCCH resource 204, and the SR PUCCH resource 206, respectively. In response to determining that the PUCCH resources 202, 204, and 206 overlap with one another in the time-domain, the bits of the HARQ-ACK, the CSI, and the SR are multiplexed together to generate a multiplexed UCI. The final PUCCH resource 210 on which the multiplexed UCI is transmitted is re-determined. In some examples, the final PUCCH resource 210 is determined by selecting a PUCCH resource set according to a number of bits of the multiplexed UCI. A PUCCH resource is selected from the PUCCH resource set according to the indication in the scheduling DCI of the last PDSCH corresponding to the HARQ-ACK. A PUCCH format is determined according to the indication in the scheduling DCI of the last PDSCH corresponding to the HARQ-ACK. The UE can transmit the multiplexed UCI on the final PUCCH resource 210. The PUCCH resource and format of the PUCCH resource used to transmit the HARQ-ACK multiplexed with either of the CSI or the SR can be determined using a similar method.

Figure 7:
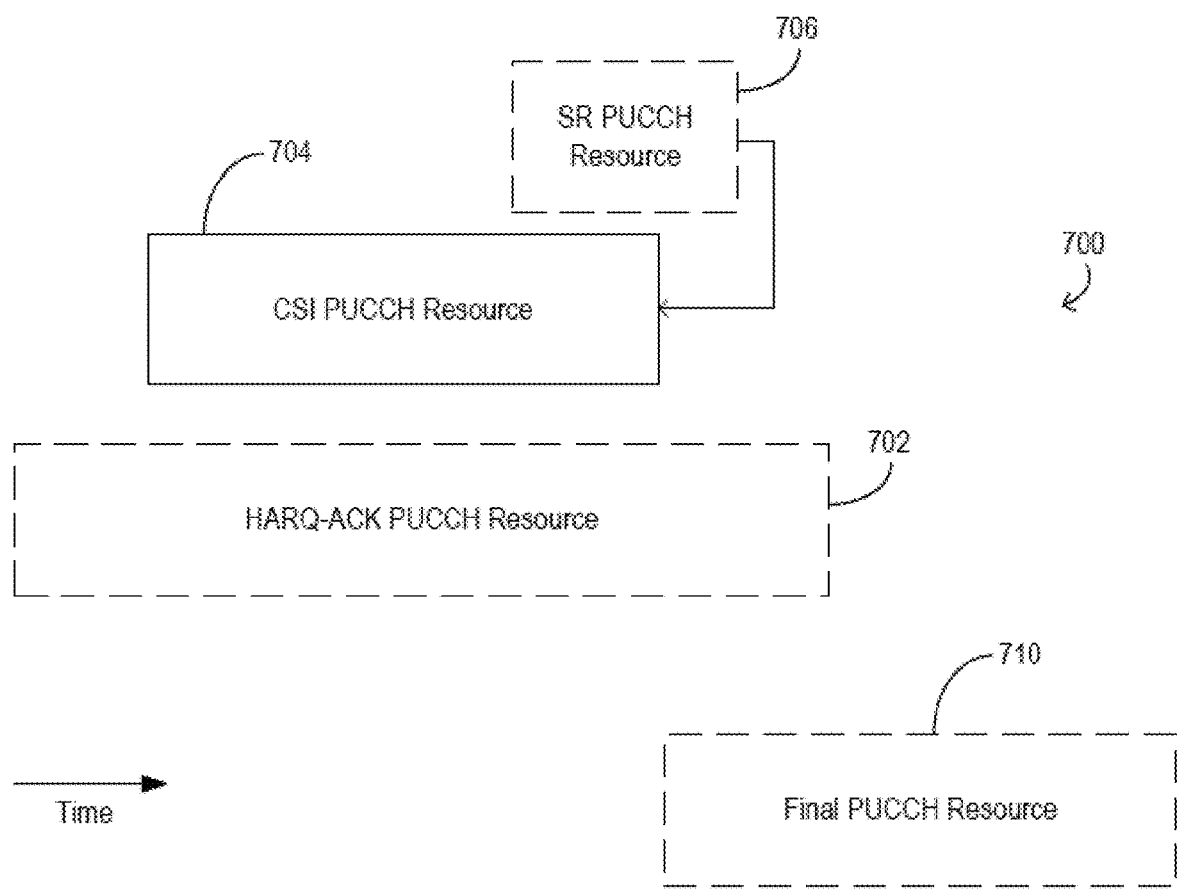
FIG. 7 is a schematic diagram illustrating a method for determining a PUCCH resource for transmitting UCI, in accordance with some embodiments of the present disclosure.

FIG. 7 is a schematic diagram illustrating a method 700 for determining a PUCCH resource for transmitting UCI, in accordance with some embodiments of the present disclosure. Referring to FIGS. 1-7, in some case, all bits of a type of the UCI (e.g., the HARQ-ACK, as an example) is transmitted on the transmitted portion 610 (of PUCCH resource 710, which can be the PUCCH 406 or 506). An originally allocated HARQ-ACK PUCCH resource 702 is not used. A remainder of the UCI that needs to be transmitted includes other types of the UCI (e.g., the CSI and SR, as examples). Given that the originally configured uplink transmission resource (e.g., CSI PUCCH resource 704) for transmitting the CSI overlaps in the time domain with the originally configured uplink transmission resource (e.g., SR PUCCH resource 706) for transmitting the SR, as shown in the method 700, the bits of the SR information is multiplexed with the bits of the CSI to generate a multiplexed UCI. The UE transmits the multiplexed UCI on the originally configured CSI PUCCH resource 704.

In some embodiments, the UE further determines whether to transmit the remainder of the UCI (e.g., the CSI and SR in the multiplexed UCI) that needs to be transmitted on an originally configured uplink transmission resource for one of the remainders of the UCI (e.g., the CSI PUCCH resource 704). For example, in response to determining that the CSI PUCCH resource 704 is not canceled (e.g., no collision) and that a start of the first symbol of the CSI PUCCH resource 704 is after time point A (with respect to the embodiments described with reference to FIG. 4) or point B (with respect to the embodiments described with reference to FIG. 5), respectively, the UE determines that the multiplexed UCI is transmitted on the CSI PUCCH resource 704. On the other hand, in response to determining that the CSI PUCCH resource 704 is canceled (e.g., collision) or that a start of the first symbol of the CSI PUCCH resource 704 is before time point A (with respect to the embodiments described with reference to FIG. 4) or point B (with respect to the embodiments described with reference to FIG. 5), respectively, the UE determines that the multiplexed UCI is not transmitted on the CSI PUCCH resource 704.

In some embodiments, the UE determines whether to transmit the multiplexed UCI on the CSI PUCCH resource 704 using alternative methods. For example, in response to determining that the CSI PUCCH resource 704 is not canceled (e.g., no collision), that a start of the first symbol of the CSI PUCCH resource 704 is after time point A (with respect to the embodiments described with reference to FIG. 4) or point B (with respect to the embodiments described with reference to FIG. 5), respectively, and that the time interval T (e.g., the time interval from the end of the last symbol of the UL CI 416 or 516 to the start of the first symbol of the CSI PUCCH resource 704) is greater than or equal to the time required for the UE to decode the UL CI 416 or 516 and prepare the PUCCH transmission of the multiplexed UCI, the UE determines that the multiplexed UCI is transmitted on the CSI PUCCH resource 704. On the other hand, in response to determining that the CSI PUCCH resource 704 is canceled (e.g., collision), that a start of the first symbol of the CSI PUCCH resource 704 is before time point A (with respect to the embodiments described with reference to FIG. 4) or point B (with respect to the embodiments described with reference to FIG. 5), respectively, or that the time interval T is less than to the time required for the UE to decode the UL CI 416 or 516 and prepare the PUCCH transmission of the multiplexed UCI, the UE determines that the multiplexed UCI is not transmitted on the CSI PUCCH resource 704.

In some embodiments, the UE cancels transmission on the canceled portion of the PUSCH 402 or the PUSCH 502 according to the UL CI 416 or 516. Specifically, the UE cancels transmission on the portion of the PUSCH 402 that is after time point A. The UE cancels transmission on the portion of the PUSCH 502 that is after time point B. The portions of the PUSCH 402 and the PUSCH 502 before the time points A and B, respectively, can still be used to transmit data. As shown in FIG. 6, the PUSCH 402 or the PUSCH 502 includes the transmitted portion 610 and the canceled portion 620, where data can be transmitted on the transmitted portion 610.

In some examples in which the UCI to be transmitted includes two or more different types of UCI (e.g., two or more different ones of HARQ-ACK, SR, and CSI), the UE determines whether all bits of each type of UCI are transmitted in the transmitted portion 610 (e.g., the portion of the PUSCH 402 before the time point A or in the portion of the PUSCH 502 before the time point B). In one scenario, all bits of one or more types of the UCI (e.g., all bits of the CSI) can be transmitted on the transmitted portion 610, and all bits of other types of the UCI (e.g., all bits of the HARQ-ACK and SR) cannot be transmitted on the transmitted portion 610, the UE determines whether to use the PUCCH to transmit the other types of the UCI for which transmission is incomplete.

Figure 8:
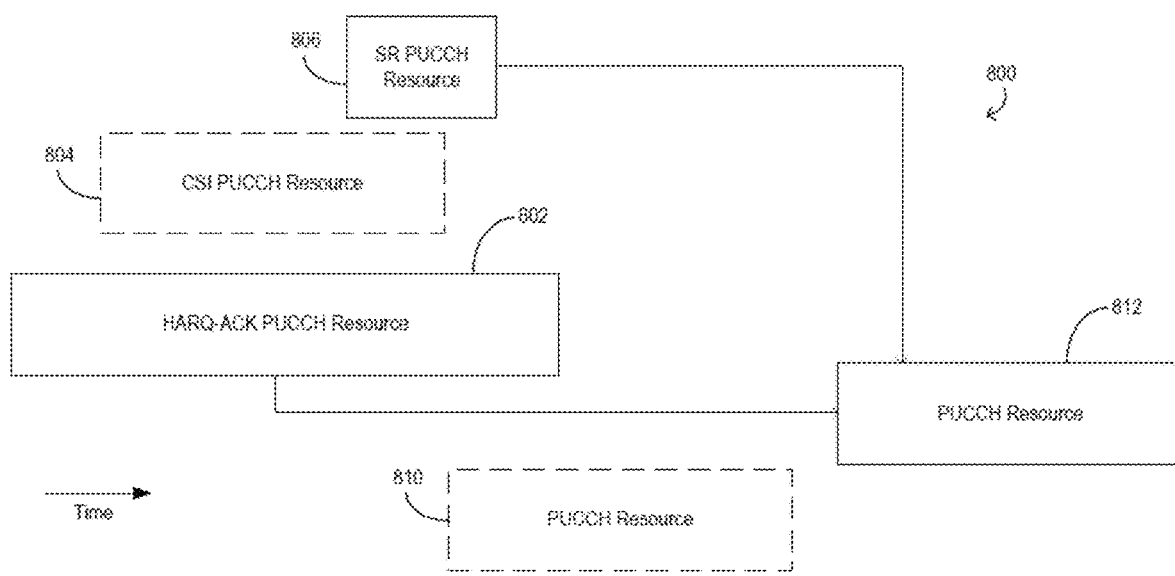
FIG. 8 is a schematic diagram illustrating a method for determining a PUCCH resource for transmitting UCI, in accordance with some embodiments of the present disclosure.

In that regard, FIG. 8 is a schematic diagram illustrating a method 800 for determining a PUCCH resource for transmitting UCI, in accordance with some embodiments of the present disclosure. Referring to FIGS. 1-8, the HARQ-ACK, the CSI, and the SR are separately configured with PUCCH resources—the HARQ-ACK PUCCH resource 802, the CSI PUCCH resource 804, and the SR PUCCH resource 806, respectively. A PUCCH resource 810 is a PUCCH resource determined in the manner described with reference to FIG. 2, e.g., the PUCCH resource 810 is the final PUCCH resource 210 used to carry the multiplexed UCI containing the multiplexed HARQ-ACK, the CSI, and the SR. In some examples, a portion of the PUCCH resource 810 is canceled, and the complete CSI is transmitted on a transmitted portion of the PUCCH resource 810 while the complete HARQ-ACK and the SR are not transmitted on the transmitted portion of the PUCCH resource 810. In this case, the bits of the HARQ-ACK and the SR are multiplexed together to generate a new multiplex UCI. A number of bits in the new multiplexed UCI has therefore changed, resulting in the PUCCH resource set being changed. The RRC signaling configures multiple PUCCH resource sets for the UE based on different numbers of bits of the UCI. That is, different PUCCH resource sets correspond to different numbers of bits in the new multiplexed UCI. A PUCCH resource 812 is selected from the PUCCH resource set according to the indication in the scheduling DCI of the last PDSCH corresponding to the HARQ-ACK. A PUCCH format of the PUCCH resource 812 is determined according to the indication in the scheduling DCI of the last PDSCH corresponding to the HARQ-ACK. The UE can transmit the new multiplex UCI on the PUCCH resource 812.

In some embodiments, the UE further determines whether to transmit the remainder of the UCI (e.g., the HARQ-ACK and SR in the new multiplexed UCI) that needs to be transmitted on the PUCCH resource 812. For example, in response to determining that the PUCCH resource 812 is not canceled (e.g., no collision) and that a start of the first symbol of the PUCCH resource 812 is after time point A (with respect to the embodiments described with reference to FIG. 4) or point B (with respect to the embodiments described with reference to FIG. 5), respectively, the UE determines that the new multiplexed UCI is transmitted on the PUCCH resource 812. On the other hand, in response to determining that the PUCCH resource 812 is canceled (e.g., collision) or that a start of the first symbol of the PUCCH resource 812 is before time point A (with respect to the embodiments described with reference to FIG. 4) or point B (with respect to the embodiments described with reference to FIG. 5), respectively, the UE determines that the new multiplexed UCI is not transmitted on PUCCH resource 812.

In some embodiments, the UE determines whether to transmit the new multiplexed UCI on the PUCCH resource 812 using alternative methods. For example, in response to determining that the PUCCH resource 812 is not canceled (e.g., no collision), that a start of the first symbol of the PUCCH resource 812 is after time point A (with respect to the embodiments described with reference to FIG. 4) or point B (with respect to the embodiments described with reference to FIG. 5), respectively, and that the time interval T (e.g., the time interval from the end of the last symbol of the UL CI 416 or 516 to the start of the first symbol of the PUCCH resource 812) is greater than or equal to the time required for the UE to decode the UL CI 416 or 516 and prepare the PUCCH transmission of the new multiplexed UCI, the UE determines that the new multiplexed UCI is transmitted on the PUCCH resource 812. On the other hand, in response to determining that the PUCCH resource 812 is canceled (e.g., collision), that a start of the first symbol of the PUCCH resource 812 is before time point A (with respect to the embodiments described with reference to FIG. 4) or point B (with respect to the embodiments described with reference to FIG. 5), respectively, or that the time interval T is less than to the time required for the UE to decode the UL CI 416 or 516 and prepare the PUCCH transmission of the new multiplexed UCI, the UE determines that the new multiplexed UCI is not transmitted on the PUCCH resource 812.

In some embodiments, the UE cancels transmission on the canceled portion of the PUSCH 402 or the PUSCH 502 according to the UL CI 416 or 516. Specifically, the UE cancels transmission on the portion of the PUSCH 402 that is after time point A. The UE cancels transmission on the portion of the PUSCH 502 that is after time point B. In some examples, the entirety of the PUSCH 402 or the PUSCH 502 can be canceled responsive to a UL CI.

In some situations, in determining whether a PUCCH can be used to transmit the UCI in the manner described, the UE determines that the PUCCH (e.g., the PUCCH 406 or 506) is also canceled given that, for example, the PUCCH is allowed to be canceled by any uplink transmission with higher priorities, and the PUCCH resource overlaps with another uplink transmission resource (for an uplink transmission with a higher priority) as indicated by a UL CI. Alternatively, the UE determines that the PUCCH is otherwise unavailable for transmitting the UCI given that, for example, the start of the first symbol of the PUCCH resource is earlier than time point A (with respect to the embodiments described with reference to FIG. 4) or time point B (with respect to the embodiments described with reference to FIG. 4). In response to determining that the original PUCCH cannot be used to transmit the UCI, the UE proceeds to determine a new PUCCH resource for transmitting the UCI.

In some implementations, the UE selects a PUCCH resource within the PUCCH resource set to which the original PUCCH resource belongs, where the selected PUCCH resource has a format that is the same as a format of the original PUCCH resource. the start of the first symbol of the selected PUCCH resource is no earlier than time point A (with respect to the embodiments described with reference to FIG. 4) or point B (with respect to the embodiments described with reference to FIG. 5). The UE uses the selected PUCCH resource as the new PUCCH resource on which the UCI is transmitted. In response to determining that a plurality of PUCCH resources satisfy the conditions as noted herein, a selection rule can be implemented to select one of such PUCCH resources for transmitting the UCI. In some example, a first PUCCH resource in the PUCCH resource set that satisfies the conditions as noted herein is selected for transmitting the UCI. In another example, the PUCCH resource of the multiple PUCCH resources (that satisfy the conditions noted herein) having the earliest start of the first symbol is selected for transmitting the UCI. Other selection rules can be likewise implemented.

FIG. 9A is a flowchart diagram illustrating a method 900a for restoring UCI transmission, in accordance with some embodiments of the present disclosure. Referring to FIGS. 1-9A, the method 900a is implemented by a UE in the manner described herein.

At 910a, the UE determines that transmission of UCI on at least a portion of a first uplink resource (e.g., the PUSCH) is canceled. In some examples, the UCI includes at least one of the HARQ-ACK information, the CSI, or the SR. In some examples, the transmission of the UCI on the first uplink resource is canceled in response to the transmission of the UCI on the first uplink resource colliding with a transmission having a priority higher than a priority of the transmission of the UCI on the first uplink resource.

In some examples, the UE determines that the transmission of the UCI on the first uplink resource is canceled in response to receiving an uplink grant from a base station indicating that the first uplink resource is released. In some examples, the UE determines that the transmission of the UCI on the first uplink resource is canceled in response to receiving UL CI from a base station indicating that the transmission on the first uplink resource is canceled. In some examples, the UE determines that the transmission of the UCI on the first uplink resource is canceled in response to receiving transmission power reduction commands.

At 920a, in response to determining that the transmission of the UCI on the first resource is canceled, the UE determines a second uplink resource (e.g., the PUCCH) for transmitting the UCI.

In some examples, determining the second uplink resource for transmitting the UCI includes defining a first time interval from an end of a last symbol of the UL CI to a start of a first symbol of the second uplink resource, defining a second time interval as a length of time needed by the UE to decode the UL CI and to prepare transmitting the UCI on the second uplink resource, and determining the second uplink resource for transmitting the UCI in response to determining that the first time interval is greater than or equal to the second time interval.

In some examples, the second uplink resource is determined for transmitting the UCI in response to determining that a canceled portion of the first uplink resource starts from a start time point indicated by an UL CI, determining that the second uplink resource is not canceled, and determining that a start of a first symbol of the second uplink resource is no earlier than the start time point.

In some examples, the second uplink resource is determined for transmitting the UCI in response to determining that the UE cancels the transmission on a canceled portion of the first uplink resource from a time interval after an end of the last symbol of the UL CI, that the time interval corresponds to a length of time needed by the UE to decode the UL CI and to prepare transmitting the UCI on the second uplink resource, and that a start of a first symbol of the second uplink resource is no earlier than a start time point of the canceled portion of the first uplink resource.

In some examples, the first uplink resource comprises a canceled portion and a transmitted portion. The method 900a further includes determining whether all bits of the UCI are transmitted on the transmitted portion of the first uplink resource. In some examples, the second uplink resource is determined for transmitting the UCI in response to determining that not all bits of the UCI are transmitted on the transmitted portion of the first uplink resource, determining that the second uplink resource is not canceled, determining that a start of a first symbol of the second uplink resource is no earlier than a start time point of the canceled portion of the first uplink resource, and determining that a first time interval is greater than or equal to a second time interval, an UL CI indicating that the transmission on the first uplink resource is canceled is received by the UE. The first time interval is defined from an end of a last symbol of the UL CI to a start of a first symbol of the second uplink resource. The second time interval is defined as a length of time needed by the UE to decode the UL CI and to prepare transmitting the UCI on the second uplink resource.

In some examples, the second uplink resource is determined for transmitting the UCI in response to determining that not all bits of the UCI are transmitted on the transmitted portion of the first uplink resource, that the second uplink resource is not canceled, and that a start of the first symbol of the second uplink resource is no earlier than a start time point of the canceled portion of the first uplink resource.

In some examples, the UCI comprises different types of the UCI. The second uplink resource is determined for transmitting one of the different types of the UCI in response to determining that not all bits of the one of the different types of the UCI are transmitted on the transmitted portion of the first uplink resource, that the second uplink resource is not canceled, that a start of a first symbol of the second uplink resource is after a start time point of the canceled portion of the first uplink resource, and that a first time interval is greater than or equal to a second time interval, an UL CI indicating that the transmission on the first uplink resource is canceled is received by the UE. The first time interval is defined from an end of a last symbol of the UL CI to a start of a first symbol of the second uplink resource. The second time interval is defined as a length of time needed by the UE to decode the UL CI and to prepare transmitting the one of the different types of the UCI on the second uplink resource.

In some examples, the second uplink resource is determined for transmitting one of the different types of the UCI in response to determining that not all bits of the one of the different types of the UCI are transmitted on the transmitted portion of the first uplink resource, that the second uplink resource is not canceled, and that a start of the a first symbol of the second uplink resource is no earlier than a start time point of the canceled portion of the first uplink resource.

In some examples, determining the second uplink resource for transmitting the UCI includes determining that all bits of a first type of the different types of the UCI is transmitted on a transmitted portion of the first uplink resource, determining that not all bits of second types of the different types of the UCI are transmitted on the transmitted portion of the first uplink resource; and determining the second uplink resource for transmitting the second types of the UCI. In some examples, the method 900a further includes transmitting, by the UE, a multiplex UCI generated by multiplexing bits of the second types of the UCI. The second uplink resource is originally configured to carry one of the second types of the UCI in transmission. The second uplink resource is determined based on a number of bits of the multiplex UCI.

At 930a, the UE transmits the UCI on the second uplink resource.

FIG. 9B is a flowchart diagram illustrating a method 900b for restoring UCI transmission, in accordance with some embodiments of the present disclosure. Referring to FIGS. 1-9B, the method 900b is implemented by a base station in the manner described herein. The base station determines that the transmission of the UCI on the first uplink resource is canceled in response to determining that the transmission of the UCI on the first uplink resource collides with a transmission having a priority higher than a priority of the transmission of the UCI on the first uplink resource.

At 910*b*, the base station indicates to a UE that transmission of UCI on at least the portion of the first uplink resource is canceled. In some examples, the base station indicates that the transmission of the UCI on at least the portion of the first uplink resource is canceled by transmitting, to the wireless communication device, one of an uplink grant indicating that the portion of the first uplink resource is released, a UL CI indicating that the transmission on the first uplink resource is canceled, or a transmission power reduction command.

At 920*b*, the base station receives from the UE the UCI on the second uplink resource.

Figure 10B:
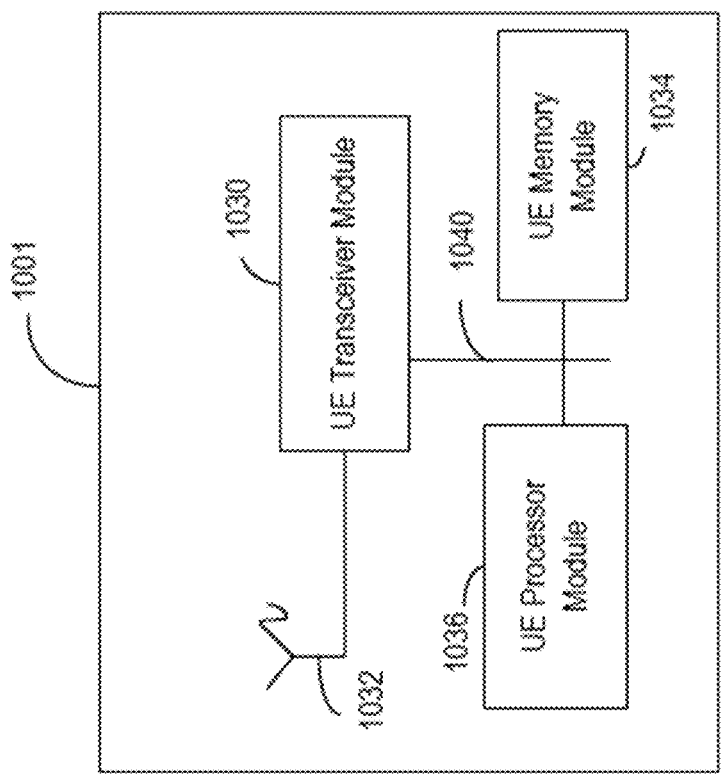
FIG. 10B illustrates a block diagram of an example UE, in accordance with some embodiments of the present disclosure.
Figure 10A:
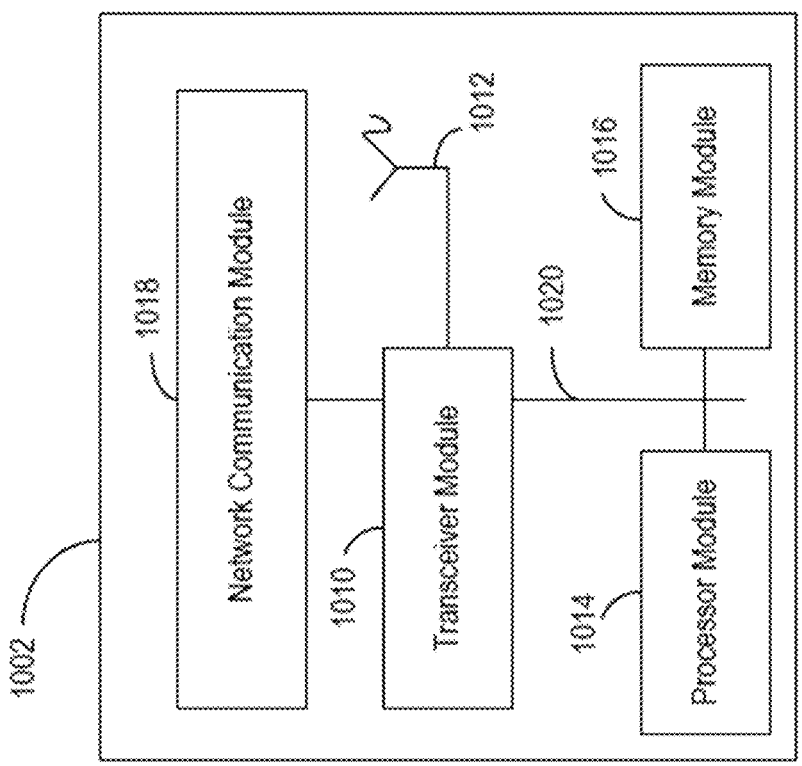
FIG. 10A illustrates a block diagram of an example base station, in accordance with some embodiments of the present disclosure.

FIG. 10A illustrates a block diagram of an example base station 1002, in accordance with some embodiments of the present disclosure. FIG. 10B illustrates a block diagram of an example UE 1001, in accordance with some embodiments of the present disclosure. Referring to FIGS. 1-10B, the UE 1001 (or a wireless communication device) is an example implementation of the UEs described herein, and the base station 1002 is an example implementation of the base station described herein.

The base station 1002 and the UE 1001 can include components and elements configured to support known or conventional operating features that need not be described in detail herein. In one illustrative embodiment, the base station 1002 and the UE 1001 can be used to communicate (e.g., transmit and receive) data symbols in a wireless communication environment such as the network system architecture 100 and the slice deployment 200, as described above. For instance, the base station 1002 can be a base station (e.g., gNodeBs (gNBs), and so on), a server, a node, or any suitable computing device used to implement various network functions.

The base station 1002 includes a transceiver module 1010, an antenna 1012, a processor module 1014, a memory module 1016, and a network communication module 1018. The module 1010, 1012, 1014, 1016, and 1018 are operatively coupled to and interconnected with one another via a data communication bus 1020. The UE 1001 includes a UE transceiver module 1030, a UE antenna 1032, a UE memory module 1034, and a UE processor module 1036. The modules 1030, 1032, 1034, and 1036 are operatively coupled to and interconnected with one another via a data communication bus 1040. The base station 1002 communicates with the UE 1001 or another base station via a communication channel, which can be any wireless channel or other medium suitable for transmission of data as described herein.

As would be understood by persons of ordinary skill in the art, the base station 1002 and the UE 1001 can further include any number of modules other than the modules shown in FIGS. 10A and 10B. The various illustrative blocks, modules, circuits, and processing logic described in connection with the embodiments disclosed herein can be implemented in hardware, computer-readable software, firmware, or any practical combination thereof. To illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. The embodiments described herein can be implemented in a suitable manner for each particular application, but any implementation decisions should not be interpreted as limiting the scope of the present disclosure.

In accordance with some embodiments, the UE transceiver 1030 includes a radio frequency (RF) transmitter and a RF receiver each including circuitry that is coupled to the antenna 1032. A duplex switch (not shown) may alternatively couple the RF transmitter or receiver to the antenna in time duplex fashion. Similarly, in accordance with some embodiments, the transceiver 1010 includes an RF transmitter and a RF receiver each having circuitry that is coupled to the antenna 1012 or the antenna of another base station. A duplex switch may alternatively couple the RF transmitter or receiver to the antenna 1012 in time duplex fashion. The operations of the two transceiver modules 1010 and 1030 can be coordinated in time such that the receiver circuitry is coupled to the antenna 1032 for reception of transmissions over a wireless transmission link at the same time that the transmitter is coupled to the antenna 1012. In some embodiments, there is close time synchronization with a minimal guard time between changes in duplex direction.

The UE transceiver 1030 and the transceiver 1010 are configured to communicate via the wireless data communication link, and cooperate with a suitably configured RF antenna arrangement 1012/1032 that can support a particular wireless communication protocol and modulation scheme. In some illustrative embodiments, the UE transceiver 1010 and the transceiver 1010 are configured to support industry standards such as the Long Term Evolution (LTE) and emerging 5G standards, and the like. It is understood, however, that the present disclosure is not necessarily limited in application to a particular standard and associated protocols. Rather, the UE transceiver 1030 and the base station transceiver 1010 may be configured to support alternate, or additional, wireless data communication protocols, including future standards or variations thereof.

The transceiver 1010 and the transceiver of another base station (such as but not limited to, the transceiver 1010) are configured to communicate via a wireless data communication link, and cooperate with a suitably configured RF antenna arrangement that can support a particular wireless communication protocol and modulation scheme. In some illustrative embodiments, the transceiver 1010 and the transceiver of another base station are configured to support industry standards such as the LTE and emerging 5G standards, and the like. It is understood, however, that the present disclosure is not necessarily limited in application to a particular standard and associated protocols. Rather, the transceiver 1010 and the transceiver of another base station may be configured to support alternate, or additional, wireless data communication protocols, including future standards or variations thereof.

In accordance with various embodiments, the base station 1002 may be a base station such as but not limited to, an eNB, a serving eNB, a target eNB, a femto station, or a pico station, for example. The base station 1002 can be an RN, a regular, a DeNB, a gNB, or an IAB donor. In some embodiments, the UE 1001 may be embodied in various types of user devices such as a mobile phone, a smart phone, a personal digital assistant (PDA), tablet, laptop computer, wearable computing device, etc. The processor modules 1014 and 1036 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the method or algorithm disclosed herein can be embodied directly in hardware, in firmware, in a software module executed by processor modules 1014 and 1036, respectively, or in any practical combination thereof. The memory modules 1016 and 1034 may be realized as RAM memory, flash memory, ROM memory, EPROM memory, EEPROM memory, registers, a hard disk, a removable disk, a CD-ROM, or any other form of storage medium known in the art. In this regard, memory modules 1016 and 1034 may be coupled to the processor modules 1010 and 1030, respectively, such that the processors modules 1010 and 1030 can read information from, and write information to, memory modules 1016 and 1034, respectively. The memory modules 1016 and 1034 may also be integrated into their respective processor modules 1010 and 1030. In some embodiments, the memory modules 1016 and 1034 may each include a cache memory for storing temporary variables or other intermediate information during execution of instructions to be executed by processor modules 1010 and 1030, respectively. Memory modules 1016 and 1034 may also each include non-volatile memory for storing instructions to be executed by the processor modules 1010 and 1030, respectively.

The network communication module 1018 generally represents the hardware, software, firmware, processing logic, and/or other components of the base station 1002 that enable bi-directional communication between the transceiver 1010 and other network components and communication nodes in communication with the base station 1002. For example, the network communication module 1018 may be configured to support internet or WiMAX traffic. In a deployment, without limitation, the network communication module 1018 provides an 802.3 Ethernet interface such that the transceiver 1010 can communicate with a conventional Ethernet based computer network. In this manner, the network communication module 1018 may include a physical interface for connection to the computer network (e.g., Mobile Switching Center (MSC)). In some embodiments in which the base station 1002 is an IAB donor, the network communication module 1018 includes a fiber transport connection configured to connect the base station 1002 to a core network. The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

The invention claimed is:

1. A wireless communication method, comprising:
receiving, by a wireless communication device from a base station, a list of open-loop power control parameter sets;
receiving, by the wireless communication device from the base station, a downlink control information (DCI) comprising an open-loop power control parameter set indicator (OLI) and a sounding reference signal (SRS) resource indicator (SRI), wherein, the OLI indicates a subset of the list of open-loop power control parameter sets, the SRI indicates an open-loop power control parameter set from the subset;
determining, by the wireless communication device, the open-loop power control parameter set from the list of open-loop power control parameter sets according to the subset indicated by the OLI and the open-loop power control parameter set indicated by the SRI; and
performing, by the wireless communication device, power control for a transmission scheduled by the DCI using the open-loop power control parameter set.

2. The wireless communication method of claim 1, wherein the open-loop power control parameter set comprises a received power expected by the base station.

3. A wireless communication apparatus comprising at least one processor and a memory, wherein the at least one processor is configured to read code from the memory and implement a method comprising:
receiving, by a wireless communication device from a base station, a list of open-loop power control parameter sets;
receiving, by the wireless communication device from the base station, a downlink control information (DCI) comprising an open-loop power control parameter set indicator (OLI) and a sounding reference signal (SRS) resource indicator (SRI), wherein, the OLI indicates a subset of the list of open-loop power control parameter sets, the SRI indicates an open-loop power control parameter set from the subset;
determining, by the wireless communication device, the open-loop power control parameter set from the list of open-loop power control parameter sets according to the subset indicated by the OLI and the open-loop power control parameter set indicated by the SRI; and
performing, by the wireless communication device, power control for a transmission scheduled by the DCI using the open-loop power control parameter set.

4. The wireless communication apparatus of claim 3, wherein the open-loop power control parameter set comprises a received power expected by the base station.

5. A wireless communication method, comprising:
receiving, by a wireless communication device from a base station, a list of open-loop power control parameter sets;
receiving, by the wireless communication device from the base station, a downlink control information (DCI), the DCI comprising an open-loop power control parameter set indicator (OLI) and a sounding reference signal (SRS) resource indicator (SRI);
determining, by the wireless communication device, a default subset from the list of open-loop power control parameter sets, wherein the OLI and the SRI indicate an open-loop power control parameter set in the default subset from the list of open-loop power control parameter sets; and
determining, by the wireless communication device, an open-loop power control parameter in the default subset according to the open-loop power control parameter set indicated by the OLI and the SRI; and
performing, by the wireless communication device, power control for a transmission scheduled by the DCI using the open-loop power control parameter.

6. The wireless communication method of claim 5, wherein the open-loop power control parameter set comprises a received power expected by the base station.

7. The wireless communication method of claim 6, wherein the default subset determined by the wireless communication device is a first open-loop power control parameter from the list of open-loop power control parameter sets.

8. The wireless communication method of claim 5, wherein the DCI excludes or does not contain the SRI.

9. A wireless communication apparatus comprising at least one processor and a memory, wherein the at least one processor is configured to read code from the memory and implement a method comprising:
receiving, by a wireless communication device from a base station, a list of open-loop power control parameter sets;

receiving, by the wireless communication device from the base station, a downlink control information (DCI), the DCI comprising an open-loop power control parameter set indicator (OLI) and a sounding reference signal (SRS) resource indicator (SRI);

determining, by the wireless communication device, a default subset from the list of open-loop power control parameter sets, wherein the OLI and the SRI indicate an open-loop power control parameter set in the default subset from the list of open-loop power control parameter sets; and determining, by the wireless communication device, an open-loop power control parameter in the default subset according to the open-loop power control parameter set indicated by the OLI and the SRI.

10. The wireless communication apparatus of claim 9, wherein the method further comprising performing, by the wireless communication device, power control for a transmission scheduled by the DCI using the open-loop power control parameter.

11. The wireless communication apparatus of claim 9, wherein the open-loop power control parameter set comprises a received power expected by the base station.

12. The wireless communication apparatus of claim 11, wherein the default subset determined by the wireless communication device is a first open-loop power control parameter from the list of open-loop power control parameter sets.

* * * * *